UNITED STATES PATENT OFFICE.

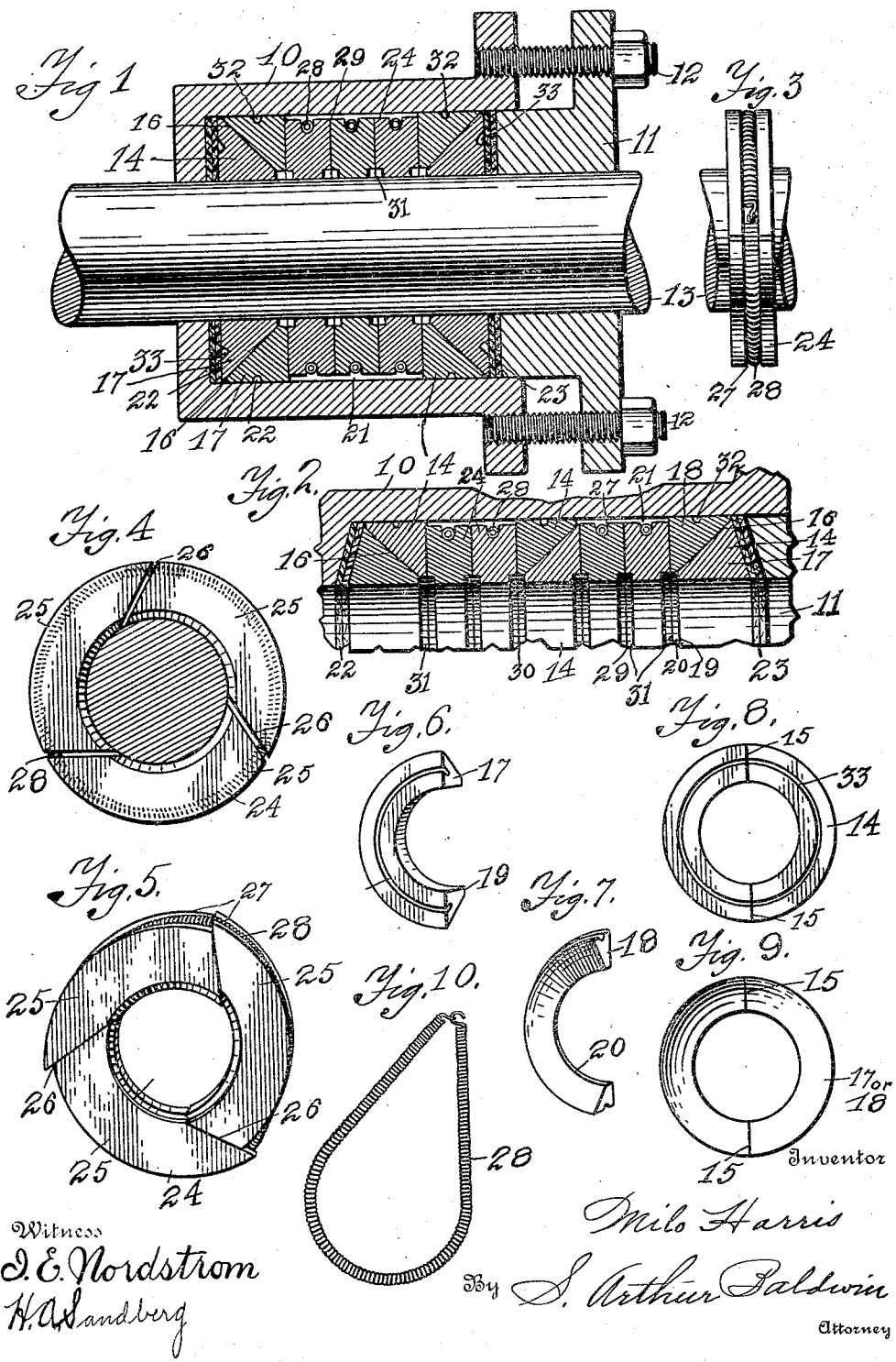

MILO HARRIS, OF JAMESTOWN, NEW YORK.

METALLIC PACKING.

1,290,985.   Specification of Letters Patent.   Patented Jan. 14, 1919.

Application filed July 1, 1918. Serial No. 242,747.

*To all whom it may concern:*

Be it known that I, MILO HARRIS, a citizen of the United States, residing at the city of Jamestown, in the county of Chautauqua and State of New York, have invented certain new and useful Improvements in Metallic Packings, of which the following, taken in connection with the accompanying drawings, is a specification.

The invention relates to metallic packing for rods in stuffing boxes on engines, power pumps, ice machines and similar constructions; and the object of the improvement is to provide a strong and simply constructed metallic packing which has spaced carrier rings which automatically adjust themselves to fill the space between the rod and the inner wall of the stuffing box when under pressure from the stuffing box gland, thereby adapting said carrier rings to inequalities or differences in the size of the different portions of said stuffing box, bracing said carrier rings firmly against the inner walls of said stuffing box and rendering the joint steam tight, resilient clamping rings being provided between said spaced carrier rings with space for movement to and from said rod to adapt said resilient clamping rings to inequalities or bends in the rods as they move backward and forward without permitting the escape of steam, air or liquid, soft packings being preferably provided for each end of said metallic packing to insure a perfect closure joint for said ends under pressure of the gland; and the invention consists in the novel features and combinations hereinafter set forth and claimed.

In the drawings, Figure 1 is a lengthwise sectional view of the stuffing box and metallic packing on a rod showing the construction and arrangement of the preferred form of the resilient clamping, carrier and soft packing rings which make up the packing; and Fig. 2 is a sectional view of the upper portion of a lengthened packing showing three of my self adjusting carrier rings instead of two as in Fig. 1, and having resilient clamping rings therebetween. Fig. 3 is an edgewise elevation of one of the resilient clamping rings on a portion of the rod showing the coil spring in a groove around the periphery of said clamping ring to resiliently hold the parts thereof in constant contacting relation on the rod while moving back and forth through the ring; and Fig. 4 is a side elevation of the resilient clamping ring showing the substantially tangential joints between the sections or parts thereof and the rabbeted groove on the inner edge adjacent the sectioned rod; and Fig. 5 is a perspective view of the resilient clamping ring with the rod removed showing the clamping draw of the coil spring upon the tangentially jointed sections with their relation toward one another. Fig. 6 is a perspective view of one-half of one portion of my self-adjusting carrier ring; and Fig. 7 shows a perspective view of the other portion of the self adjusting carrier ring with opposite bevels on each of said halves; and Fig. 8 is an end elevation of the complete carrier ring; and Fig. 9 is an elevation of both halves of one portion of the self adjusting carrier ring showing the inward bevel of the same. Fig. 10 is an elevation of the coil spring removed from the resilient clamping ring showing the manner of connecting the ends of said spring.

Like characters of reference refer to corresponding parts in the several views.

The numeral 10 designates the stuffing box which is made with a gland 11 attached thereto by screw bolts 12.

The numeral 13 designates the rod to be packed which rod is usually a reciprocating rod as for example a piston rod on an engine, power pump, ice machine or vacuum pump upon which the metallic packing is assembled within the stuffing box 10.

The preferred form of my metallic packing consists of a pair of self adjusting sectional carrier end rings designated by the numeral 14. The carrier rings 14 are preferably made in halves by means of joints 15 extending radially from the rod 13 to the inner periphery of the stuffing box 10. Each of the carrier rings 14 are split diagonally around their circumference, preferably at an angle of about 45 degrees, thereby providing the beveled joints 16 which incline inwardly toward the rod 13, up and down which the sections 17 and 18 of the carrier rings may adapt themselves under pressure from the gland 11 when the rings are in assembled relation within the stuffing box 10. The inner edges 19 of the section 17, and 20 of the section 18 are cut short so as to provide room for the upward and downward movement of said part rings in the joint 16, which upward and downward movement on account of the shape of the parts 17 and 18 really accomplishes a radial in and out movement in the space between the inner wall 21 of the stuffing box 10 and the periphery of the rod 13, thereby insuring the filling of said space.

In the preferred form shown in Fig. 1, the two carrier rings 14 are made precisely alike except that the diagonal joints 16 are preferably beveled in opposite directions so that the pressure of the gland 11 upon the two self adjusting carrier rings 14 insures both of said rings pressing outwardly and fitting perfectly against the inner wall 21 as well as against the soft packing rings 22 and 23 which are preferably provided at the opposite ends of the metallic packing and against which the self adjusting carrier rings 14 contact. The pressure of the portion 17 of the split carrier rings against the soft packing rings 22 and 23 insures a fluid tight joint against the inner end of the stuffing box 10 as well as against the inner end of the gland 11 no matter what inequalities they may contain so that the steam, air or liquid cannot pass to the inner wall 21 of the stuffing box in order to escape along the same.

A plurality of resilient clamping rings 24 are provided between the self adjusting carrier rings 14, which clamping rings 24 are made precisely alike, preferably with three parts or sections 25 having tangential joints 26 therebetween, that is, the joints 26 are substantially tangential to the inner surface of the ring and accordingly to the periphery of the rod 13. The three parts 25 which make up the clamping ring 24 have a groove 27 around their circumference. A continuous coil spring 28 is placed in the groove 27 to clamp the three parts onto the rod 13 with a resilient pressure as shown in Figs. 4 and 5. The joints 29 between the resilient clamping rings 24 and joints 30 between the clamping rings 24 and carrier rings 14 are substantially parallel and flat so that the resilient clamping rings 24, whose peripheries are in spaced or non-contacting relation to the inner wall 21 of the stuffing box 10, may move outward and inward in accordance with the inequalities in the periphery of the rod 13 as it reciprocally moves backward and forward through the metallic packing.

The rings 14 and 24 at the inner ends of the joints 16, 29 and 30 are cut away in rabbeted grooves around their inner peripheries to provide steam, air or other fluid retarding grooves 31. The cut away edges 19 and 20 of the parts 17 and 18 of the carrier rings 14 providing half of the groove 31 adjacent the inner end of the joints 30 and the rabbeted adjacent edge of the clamping ring 24 providing the other half of said groove 31. The grooves 31 are made sufficiently wide and deep to retard the steam or fluid under pressure so that it gives an opportunity for the small amount of steam which is likely to escape into said grooves 31 through some slight interstice between the packing ring and the periphery of the rod 13 a chance to expand. Said groove also provides an opening for oil and dirt, including abrading grit particles which may score the inner surface of the contacting rings 14 or 24 thereby stopping said scoring of said rings and the consequent escape of the confined fluid. The retention of the oil in the adjacent rabbeted edges of the rings which thereby form the groove 31 also provides an oil retaining receptacle or opening which assists in lubricating the rod 13 but more particularly the joints 16, 29 and 30 between the packing rings 14 and 24 so that said rings or parts of rings move freely upon the lubricated portions of one another without danger of escape of the confined fluid under pressure even should it reach the grooves 31, since said joints are filled with the oil or lubricant. For this reason when the packing is assembled in the stuffing box the gland 11 should be screwed down sufficiently tight to press all the parts firmly into contacting position against one another and against the walls of the stuffing box and should then be slightly released so that the piston or other reciprocating rod 13 may pass freely through said packing without retarding pressure and at the same time allowing the free radial out and in movement for the resilient clamping rings 24.

Small steam or other fluid retarding grooves 32 and 33 may be provided in the sides or peripheries of the parts 17 and 18 of the carrier rings extending around the same, which grooves also are used for the insertion of soft wire clamping rings which are used in assembling the parts of the carrier rings for shipment. The sections 24 of the resilient clamping rings are held by the coil springs 28 so that they cannot get out of position when clamped between the carrier rings 14 during shipment.

In the slightly modified form of packing shown in Fig. 2, a third carrier ring 14 is provided midway of the length of the packing, the packing being so long that there might be liability of some of the clamping rings 24 getting out of line under pressure. The middle carrier ring 14 is made precisely the same as the end carrier rings 14 with the exception that the part adjacent the rod 13 is provided with a rabbeted groove on both the inner edges to thereby provide grooves 31 on each side of said middle carrier ring the same as the clamping rings 24. The grooves 31 being rabbeted in the inner edges do not weaken the rings 17 and 24 as when placed in the central portion of said rings and particularly in the resilient clamping rings in which said grooves, as shown in my former Letters Patent No. 1,232,028, were made radially opposite the grooves in the peripheries of the clamping rings for the coil springs, which arrangement nearly divides the clamping ring where the space between the rod 13 and the inner wall 21 of the stuffing box 13 is narrow or insufficient to receive the usual depth of metal clamping ring.

The rabbeted grooves 31 are preferably square to thereby give the same efficiency for their entire depth as the contacting surfaces of the carrier and clamping rings are worn away by the reciprocating rod 13. This arrangement provides an equal contact surface during the process of wearing the rings away by the rod 13 and said square or rectangular shaped grooves hold a larger amount of lubricant than a V or U-shaped groove thereby aiding in the lubrication of the rod 13 and the joints 16, 29 and 30. The amount of lubricant contained in the grooves 31 is usually sufficient to float the entire surface of the rod and the joints 16, 29 and 30 thereby aiding in the steam or fluid under pressure closure of the packing.

I claim as new:—

1. In a rod packing, a single pair of sectional metal carrier rings at each end of the stuffing box having diagonal joints between the sections, said sections being each formed in halves, the inner circumferential edges of said sections at said joints being cut-away to allow the inner sections to move radially of the rod, and spring pressed clamping rings disposed between the carrier rings, said clamping rings being composed of sections movable radially of the rod and having cut-outs at their circumferential edges, the cut-outs on the inner abutting side faces of adjacent rings coöperating to form fluid receiving grooves and the cut-outs on the outer side faces of adjacent rings coöperating with the cut-outs of the carrier rings to form fluid receiving grooves, the clamping rings being of less diameter than the carrier rings, the inner faces of the inner sections of the carrier rings being flat and at right angles to the rod, and the outer sections having their greatest width next to the rod.

2. In a rod packing, a single pair of sectional metal carrier rings at each end of the stuffing box having diagonal joints between the sections, said sections being each formed in halves the inner circumferential edges of said sections at said joints being cut-away to allow the inner sections to be self-adjusting by moving radially of the rod, and spring pressed sectional clamping rings disposed in abutting relation and between the carrier rings and being self-adjusting by moving radially of the rod the inner faces of the inner sections of the carrier rings being flat and at right angles to the rod, and the outer sections having their greatest width next to the rod.

3. In a rod packing, a single pair of metal carrier rings formed in sections at each end of the stuffing box and having diagonal joints between the sections, said sections being each formed in halves the inner faces of the inner sections being flat, and a series of sectional and radially movable clamping rings disposed in abutting relation between the carrier rings, the clamping rings having flat side faces and the inner faces of the inner sections of the carrier rings being flat and at right angles to the rod and in abutting engagement with the adjacent flat faces of the adjacent clamping rings the outer sections having their greatest width next to the rod.

In testimony whereof I have affixed my signature in the presence of two witnesses.

MILO HARRIS.

Witnesses:
H. A. SANDBERG,
FRANK G. CURTIS.